United States Patent [19]

Hollister

[11] 4,010,400
[45] Mar. 1, 1977

[54] LIGHT GENERATION BY AN ELECTRODELESS FLUORESCENT LAMP

[76] Inventor: Donald D. Hollister, 2031 Tweed St., Placentia, Calif. 92670

[22] Filed: Aug. 13, 1975

[21] Appl. No.: 604,226

[52] U.S. Cl. .............................. 315/248; 313/197; 315/39; 315/267; 315/283; 315/344
[51] Int. Cl.² .................. H05B 41/16; H05B 41/24
[58] Field of Search ............ 315/57, 344, 267, 283, 315/40, DIG. 7, 39, 248; 313/199, 201, 202, 234

[56] References Cited

UNITED STATES PATENTS

| | | | |
|---|---|---|---|
| 2,030,957 | 2/1936 | Bethenod et al. | 313/201 |
| 2,777,966 | 1/1957 | Olmstead et al. | 313/199 |
| 3,500,118 | 3/1970 | Anderson | 313/57 |
| 3,521,120 | 7/1970 | Anderson | 313/201 |

*Primary Examiner*—Saxfield Chatmon, Jr.
*Attorney, Agent, or Firm*—Philip M. Hinderstein

[57] ABSTRACT

An electrodeless discharge lamp has an ionizable medium comprising a particular gas composition at a particular pressure within a sealed envelope. Radio frequency electrical power is applied to an induction coil, the magnetic induction field of which is coupled to the medium. For a particular radio frequency, the magnitude of the induction field is selected to maximize the light emitted by the discharge per watt of radio frequency power coupled thereto. The radio frequency is preferably between 3 megahertz and 300 megahertz. In one embodiment, a mixture of mercury vapor and argon is contained within an envelope having an open cylindrical cavity into which the coil fits; the portion of the interior surface of the envelope defining the cavity has a layer of an electrically insulative, ultraviolet reflective material, and the entire interior surface of the envelope has a phosphor layer; radio frequency power at a frequency of about 4 megahertz is applied to the coil by an oscillator having a tuned circuit including the inductor and the discharge.

28 Claims, 6 Drawing Figures

LIGHT GENERATION BY AN ELECTRODELESS FLUORESCENT LAMP

BACKGROUND OF THE INVENTION

This invention relates to electrodeless discharges and, more particularly, to improving the conversion efficiency of electrical power to light by means of an electrodeless discharge.

The incandescent lamp is a principal source of lighting in homes and businesses. However, its light emitting filament evaporates and becomes weak with use, hence is easily fractured or dislodged from its supports. Thus, the lifetime of an incandescent lamp is short and unpredictable. More importantly, the efficiency of an incandescent lamp in converting electrical power to light is very low, e.g., approximately 15 lumens of light per watt of electrical power.

Fluorescent lamps are generally more efficient and durable than incandescent lamps. However, the conventional fluorescent lamp requires both a ballast supply and a special fixture which must be installed before a lamp can be used. Further, the electrodes are subject to disintegration over a period of time.

Alternative concepts exist within the prior art which provide for lighting devices in which electrodes are absent. No such devices are yet, however, commercially available.

One class of device is described by J. M. Anderson in U.S. Pat. No's 3,500,118 and 3,521,120, and is based on the concept that air-cored high frequency transformers, when employed to transfer power into electrodeless arc discharges, yield inefficient coupling of energy to the discharge, resulting in a loss of power by radiation which is prohibitive, and which may be dangerous. In this respect, it has been stated that such devices have never been successfully operated for useful periods at any reasonable efficiency. Thus, a claim is made that a ferrite core within the induction coil is required to promote efficient coupling of power to an electrodeless arc.

Ferrite materials, when employed in such a application, promote considerable inefficiency. Initially, such materials increase the inductance of the induction coil to such an extent that adequately high frequency operation is impossible. Thus, ferrite-cored devices are inherently low frequency devices, and their operation requires excessively high induction field strengths. Secondly, hysteresis losses in ferrite cores promote heating of the ferrite material, and the circulating current in the coil wound about the ferrite core also promotes conductive heating of the core, as does direct and indirect optical radiation emitted by the discharge and falling onto the core or intervening material, and as do any ohmic effects present in the core. It is well known that at the Curie temperature, usually in the vicinity of 100° C – 150° C, the permeability of most common ferrites reduces discontinuously to a very low value. When this core temperature is achieved during system operation, the induction coil is effectively unloaded by the large decrease in its inductance, the magnitude of the induction field decreases substantially, the discharge extinguishes, and the now unloaded transistor rapidly fails due to thermal runaway. Also, the cost of a suitable ferrite core for such devices is of the same order as the cost of the entire remainder of the electronic system powering the discharge. Thus, not only does such a core promote system inefficiency and reduce its operational reliability, but it substantially raises the cost of the electronic system a well.

In the referenced prior art, an auxiliary discharge starting circuit impresses an electric field on the lamp to provide initial ionization. Subsequently, energy is coupled into the discharge by means of the alternating magnetic field of the ferrite core. Input voltage and current to the five turn primary winding of the ferrite transformer, respectively, are 50 volts and 0.6 amperes at a frequency of 50 kilohertz, while the induced voltage and current are given as approximately 10 volts and 3 amperes, respectively, with a core loss of approximately 3 watts. The luminous efficacy claimed for the device is 40 lumens per watt, but substantial circuit losses are not included in this figure.

Laboratory studies have confirmed that the rectified input voltage to this circuit, when drawn from a 110 VAC line, is 155 volts. A 50 volt input to the ferrite transformer is obtainable only under class A conditions where a 30 watt high frequency output requires circuit input power in excess of 60 watts. Therefore, overall circuit luminous efficacy for this device can be no greater than 20 lumens per watt, a figure only slightly in excess of the luminous efficacy of a conventional incandescent lamp.

SUMMARY OF THE INVENTION

According to the present invention, after initiating an electrodeless discharge in an ionizable medium, the discharge is maintained in the medium, which comprises a particular gas composition at a particular pressure, by coupling to the medium a radio frequency magnetic induction field having a frequency and magnitude such that on the average, the free electrons are accelerated to ionizing velocity in a distance equal to their mean free path in a time approximately equal to onequarter of the sinusoidal period of the field frequency. This optimizes the efficiency of conversion of radio frequency power to light by the discharge.

Generally, the state of the art of electronic components places limitations on the frequency and/or magnitude of the radio frequency magnetic induction field that can be generated efficiently. Accordingly, one aspect of the invention is the selection of the magnitude of the induction field for a given field frequency, gas pressure, and gas composition to maximize the conversion efficiency of radio frequency power to light. Another aspect of the invention is the selection of the frequency of the magnetic induction field for a given field magnitude, gas pressure, and gas composition to maximize the conversion efficiency of radio frequency power to light. (In general, for good conversion efficiency, the frequency is preferably in the range of 3 to 300 megahertz.) As a result the efficiency of conversion of direct current power to radio frequency power can also be optimized by observing the limitations placed upon the value of frequency and/or magnitude of the magnetic induction field by the performance characteristics of the radio frequency generating electronic components.

In summary, since the mean free path depends upon the particular gas composition and the particular pressure, the pressure of the ionizable medium, the gas composition of the ionizable medium, the frequency of the magnetic induction field, and the magnitude of the magnetic induction field are the four interrelated variables that determine the efficiency with which the radio frequency power coupled to the medium is converted to light. The conversion efficiency as a function of any one of these variables, while the other three are held constant, has an optimum value at a particular value of the one variable.

In a preferred embodiment of the invention, a sealed envelope shaped as an incandescent lamp bulb is charged with mercury vapor and an inert starting gas, such as argon. A layer of fluorescent light emitting phosphor is disposed on the interior surface of the envelope, and an induction coil is positioned in an open cylindrical cavity extending through the envelope so a substantial portion of its magnetic induction field passes through the charge. A radio frequency oscillator having a tuned circuit including the coil in series with a capacitor is housed within a base that screws into a conventional incandescent lamp socket. The oscillator generates electrical energy at a radio frequency of four megahertz, which is applied to the coil to produce the field. The electric field across the coil initiates ionization of the mercury vapor in the envelope and the magnetic induction field maintains such ionization so as to emit ultraviolet light that excites the phosphor to emit white light. An electrically insulative, ultraviolet reflective layer may be disposed under the phosphor on the interior of the portion of the envelope defining the cylindrical cavity to prevent loss of ultraviolet light therethrough.

BRIEF DESCRIPTION OF THE DRAWINGS

The features of a specific embodiment of the best mode contemplated of carrying out the invention are illustrated in the drawings, in which.

DETAILED DESCRIPTION OF THE SPECIFIC EMBODIMENT

In sharp contrast with the prior art's concern with coupling, I have discovered that the efficient coupling of energy to the discharge presents no significant problem when the discharge system is designed by the method described below, and the discharge itself is made the lossy part of the electronic system's resonant circuit. Thus, within practical limits, no significant coupling-derived constraints on induction system design are recognized in the production of electrodeless arc discharges, and in particular, electrodeless arc discharges suited to fluorescent lighting applications. Thus, I have successfully produced electrodeless arc discharges both within the outside of conventional high frequency resonant solenoids, single turn loops, and extended structures such as bifilar circuits, where the discharge vessel shape has been varied from spherical to a long cylinder. It has been my observation that any inductor shape that can be derived from a conformal transformation of a simple resonant loop or sheet is applicable to the efficient excitation of electrodeless lamps. Thus, it is entirely feasible to cause induced currents to traverse the length of a long cylindrical lamp on one side of the lamp, and to return via the other side of the lamp by simply placing the lamp in close proximity to a shorted high frequency current carrying bifilar circuit running the length of the lamp. Such a circuit, for example; has successfully powered discarded conventional fluorescent lamps in which a filament had previously failed.

The present invention excludes ferrite and other core materials from commercially viable applications for reasons made obvious above. Coupling of high frequency energy from the air-core coil to the discharge presents no serious problem to one skilled in the art, provided only that the appropriate discharge parameters are selected as taught herein. Indeed, maximum efficiency of energy transfer to the discharge is realized when the induction coil and the plasma are allowed to form the resonant inductive elements of a tuned circuit. At resonance, the impedance presented to the high frequency source by the inductance formed by the induction coil and its plasma in conjunction with a suitable resonating capacitor, is a pure resistance by definition.

Prior art commonly teaches the existence of a need for auxiliary discharge starting means, and methods ranging from severe lamp bulb heating, capacitive discharge techniques, to use of step-up transformers to over-volt the neutral gas are referenced. I have found such means unnecessary when the methods taught herein are employed in selection of appropriate discharge parameters. Moreover, auxiliary discharge starting means increase system cost and decrease system reliability and, therefore, must be excluded from the design of commercially viable electrodeless arc lighting systems. In considering the criteria for determining commercial viability of an electrode-less fluorescent lamp, one must recognize that efficiency of operation, system reliability, and component cost are the prime factors which combine to establish the commercial veracity of the invention. The present disclosure teaches the method of optimization for the low pressure electrodeless arc discharge which, when employed in the design of an electrodeless fluorescent lamp system that is compatible with standard Edison base household fixtures, yields an efficiency approaching that of conventional fluorescent lamps. System reliability is enhanced by proper design according to the method of optimization taught herein, and further enhanced by the elimination and removal of components which are made unnecessary by observing this method. Thus, ferrite cores, multiple windings, auxiliary starting circuits, external reflectors, and similar components are found detrimental to system reliability and are excluded from any realistic system design. Such removal favorably and appreciably reduces system cost as well as enhancing its reliability, and has been found essential in a product intended for widespread production and use.

Figures 1, 2:
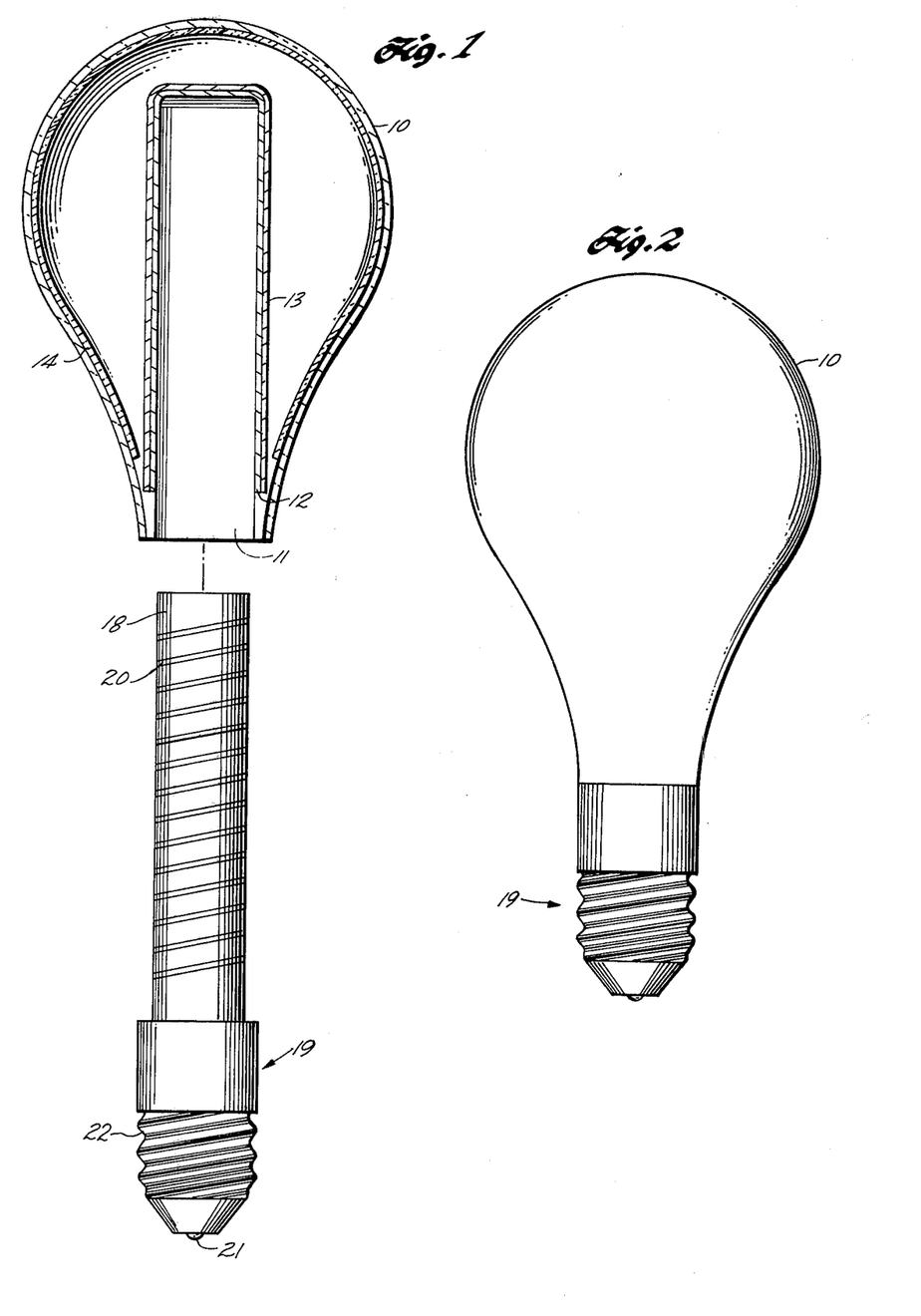
FIG. 1 is a side sectional view partially in section of an electrodeless discharge lamp with the envelope removed from the base.
FIG. 2 is a side sectional view of the lamp of FIG. 1 with the envelope mounted on the base.

In FIGS. 1 and 2, a sealed, light transmissive glass envelope 10 is charged with an ionizable gaseous medium comprising a mixture of mercury vapor and an inert gas such as argon. Envelope 10 is shown shaped as an incandescent lamp bulb; however, any sealed enclosure, such as spheral, will suffice. Typically, the partial pressure of the argon would be of the order of 1 – 5 torr. The purpose of the argon is to facilitate the initiation of a mercury discharge within envelope 10 via the well-known Penning effect, as described below. An open cylindrical cavity 11 extends through the middle of envelope 10. The portion of the interior surface of envelope 10 defining cavity 11 is coated with a layer 12 of an electrically insulative ultraviolet and white light reflective material, such as magnesium oxide or zirconium oxide, and can be overcoated with standard phosphors to enhance efficiency. A layer 13 of phosphor, such as any of the standard halophosphates or fluorophosphates, overlies layer 12 on the portion of envelope 10 defining cavity 11. The inside surface of the remainder of envelope 10 is coated with a layer 14 of the phosphor.

A hollow cylindrical coil form or mandrel 18 made of any nonconductive, nonmagnetic material is dimensioned to fit into cavity 11. One end of mandrel 18 is attached to a base 19, which screws into a conventional incandescent lamp socket. Base 19 houses a radio frequency oscillator having a tuned circuit including an induction coil 20 wrapped around or deposited on the surface of mandrel 18. The sole purpose of mandrel 18 is to support coil 20, so it can be constructed of any suitable low cost material. The end of coil 20 remote from base 19 may be connected to the radio frequency oscillator by a shielded lead passing through the hollow center of mandrel 18. Base 19 has contacts 21 and 22 through which standard 120 volt-60 cycle alternating current power is supplied to the radio frequency oscillator. When envelope 10 and base 19 are assembled, as illustrated in FIG. 2, the field produced by coil 20 lies in close proximity to the ionizable medium within envelope 10 so that the radio frequency power from the oscillator can be efficiently coupled to the medium from a physical point of view. The portion of envelope 10 that contacts base 19 can be cemented thereto to prevent accidental disassembly of the lamp, or mechanically restrained by adjustable clamps or screws to enable lamp replacement, if desired.

In the manner described below in connection with FIG. 3, the radio frequency oscillator is designed to induce a sufficiently high voltage across coil 20 when the lamp is initially turned on, so the resulting electric field breaks down, i.e., ionizes, the mercury vapor to form an arc discharge, without an external starter circuit. After the discharge is established, radio frequency power from the oscillator is coupled to the discharge through the magnetic induction field of coil 20. The ionized mercury vapor predominantely emits ultraviolet light having a wavelength of 253.7 nanometers. Part of the ultraviolet light passes outwardly to layer 14, where it is absorbed by and excites the phosphor, which emits white light suitable for illumination. The remainder of the ultraviolet light passes inwardly toward cavity 11 and is either absorbed by layer 13 or reflected back by layer 12 into the interior of envelope 10 without passing through the glass wall thereof. White light emitted by layer 13 is also reflected back into the interior of envelope 10 by layer 12. This white light passes through layer 14 and envelope 10 to contribute to the overall illumination provided by the lamp. By virtue of the existence of layer 12, loss of ultraviolet or white light through the portion of envelope 10 defining cavity 11 is avoided, and by virtue of the position of layer 12 inside envelope 10 attenuation of the ultraviolet light by useless transmission through the glass wall of envelope 10 is avoided.

The method of selection of frequency of operation and induction field strength is best taught by a consideration of the operational requirements of the electrodeless arc itself. The induced voltage which maintains the discharge is determined by the time rate-of-change of magnetic flux across the discharge path. Since the discharge area is usually fixed by lamp geometry requirements, one is enabled to adjust the induced voltage to the proper level only by adjusting the value of the product of the magnetic induction B and the radian frequency $\omega$ of this field.

In the low pressure electrodeless arc, induction field frequency must be chosen partially on the basis of optimized breakdown criteria for the particular discharge forming gas or vapor being used, at the operating pressure being considered, primarily because of the unnecessary and extravagant loss accompanying repeated ionization of the discharge forming gas or vapor between cyclic peaks of the induced maintenance voltage.

It must be recognized that, prior to initial breakdown, the induction field does not interact with the lamp or its contents. The breakdown field, therefore, must be electric in nature, and of sufficient strength to initiate the discharge. Such a field conventiently is provided by the axial electric field of this invention's induction coil, and has a value L di/dt per coil length, where L is the coil's free-space inductance, and di/dt is the time rate of change of induction coil current, given in magnitude by $\omega i$. Thus, in this invention, the magnitude of the starting electric field is directly proportional to the frequency at which the induction coil is driven, and to the induction coil current. External starting means are not required by this invention if a knowledgeable choice in these parameters is made.

On this basis, in most pure discharge forming gases at low pressure, an optimized field frequency can be determined by considering that a typical discharge electron must be accelerated to ionizing velocity in a discharge equal to its mean free path in a time approximately equal to one-quarter of the sinusoidal period of the breakdown electric field. Frequencies higher than that above will yield a less-than-maximum ionization rate because the "typical" ionizing electron which is out of phase with the applied field will not achieve ionizing velocity within its mean free path because the field will reverse and decelerate the particle which hence can make "thermal" collisions but not ionizing ones. Frequencies lower than that above yield a less-than-maximum ionization rate because the electronic velocity at mean free path's end will be less than that required for ionization. Moreover, in either case, adequate ionization for discharge maintenance can only be assured by increasing the magnitude of the induction field from the maximum value required to compensate for a less-than-optimum ionization rate. Since the discharge power requirement is proportional to the square of the magnitude of the induction field and its derivatives, a considerable and unnecessary power loss accompanies an incorrect choice in this field's frequency.

In most cases of the low pressure electrodeless arc discharge, the induction field frequency determined on the basis of the above criterion will be several megahertz to several hundred megahertz, preferably 3 mhz to 300 mhz, yielding an induction field requirement of a few gauss for typical discharges in common low pressure gases, with discharge power levels of the order of a few tens of watts.

An important situation obtains when certain mixtures of discharge forming gases and/or vapors are employed to utilize the Penning effect in an electrodeless arc discharge. Exploitation of the Penning effect requires that a mixture of discharge forming gases be present, in which the majority specie possesses at least one metastable state with energy greater than the ionization energy of the minority specie. As is known to the art, selection rule constraints render radiative de-excitation of the metastable state highly improbable, hence such states are characterized by exceptionally long lifetimes, ranging from 10 to 100 milliseconds, and depopulation of such states is largely a collisional process. In the Penning mixture, collisional depopulation of the metastably excited majority specie results in ionization of the minority constituent because the metastable energy of the former exceeds the ionization energy of the latter. The process, therefore, is very efficient in promoting ionization because every such collision is an ionizing collision.

In fluorescent lamp technology, a convenient plasma forming Penning mixture is composed of a minority amount of mercury vapor within an argon background. Mercury discharges at low pressure are efficient sources of the ultraviolet radiation at 253.7 nanometers normally used for phosphor excitation. Electrical breakdown of mercury, which requires 10.4 electron volts per atom, is facilitated by the presence of argon, which has metastable states at 11.49 and 11.66 electron volts. In this mixture initial breakdown criteria for mercury are relaxed considerably because of the relatively long lifetime of the metastably excited argon. Thus, lower frequency operation of the induction field is possible for a discharge in a Penning mixture than in the case of a discharge in pure mercury. In general, applications related to fluorescent lighting where the discharge forming gas is a Penning mixture of helium, neon, or argon and mercury, and the total pressure under operating conditions is one to several torr, low megacycle field frequencies will suffice for electrodeless fluorescent lamp operation. The magnitude of the induction field required for discharge maintenance at the frequency determined above is then obtained directly from the maintenance voltage requirement, most often one or two volts per inch of discharge path.

In summary, the magnitude and frequency of the magnetic induction field, the gas composition of the medium, and the gas pressure are all interrelated such that, on the average, free electrons in the medium are accelerated to ionizing velocity in a distance equal to their mean free path in a time approximately equal to one-quarter of the sinusoidal period of the field frequency. This provides optimum conversion efficiency from radio frequency power to light. Since the conversion efficiency depends upon the magnitude of the magnetic induction field, the frequency of the magnetic induction field, the composition of the gas or gas mixture employed, and the pressure of the gas or partial pressures of the gas mixture employed, in this manner the conversion efficiency as a function of any one of these parameters with the other three parameters held constant has an optimum value for a given value of said one parameter. Thus, when other considerations dictate certain values for three of the parameters, usually gas composition, pressure, and frequency or magnitude of the magnetic induction field, the remaining parameter, i.e., the magnitude or frequency of the magnetic induction field, can be varied to obtain the optimum conversion efficiency.

Figure 5:
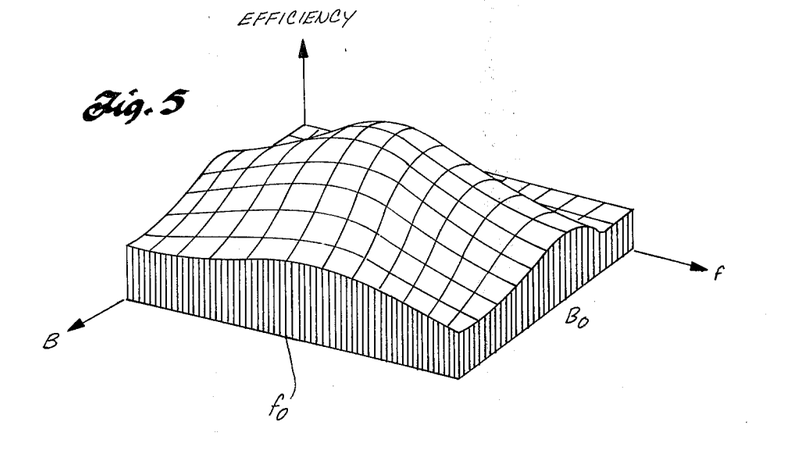
FIG. 5 is a symbolic three-dimensional map of the conversion efficiency of the lamp shown in FIGS. 1 and 2 as a function of the magnetic induction field frequency and magnitude.

FIG. 5 represents the conversion efficiency of a discharge as a function of frequency, $f$, and magnitude, $B$, of the magnetic induction field. As illustrated thereon, for any particular frequency, there is a corresponding value of magnitude at which the conversion efficiency is maximum, and, for any particular magnitude, there is a corresponding value of frequency at which conversion efficiency is maximum. Further, the optimum values of conversion efficiency are generally largest between 3 and 300 megahertz.

Figure 6:
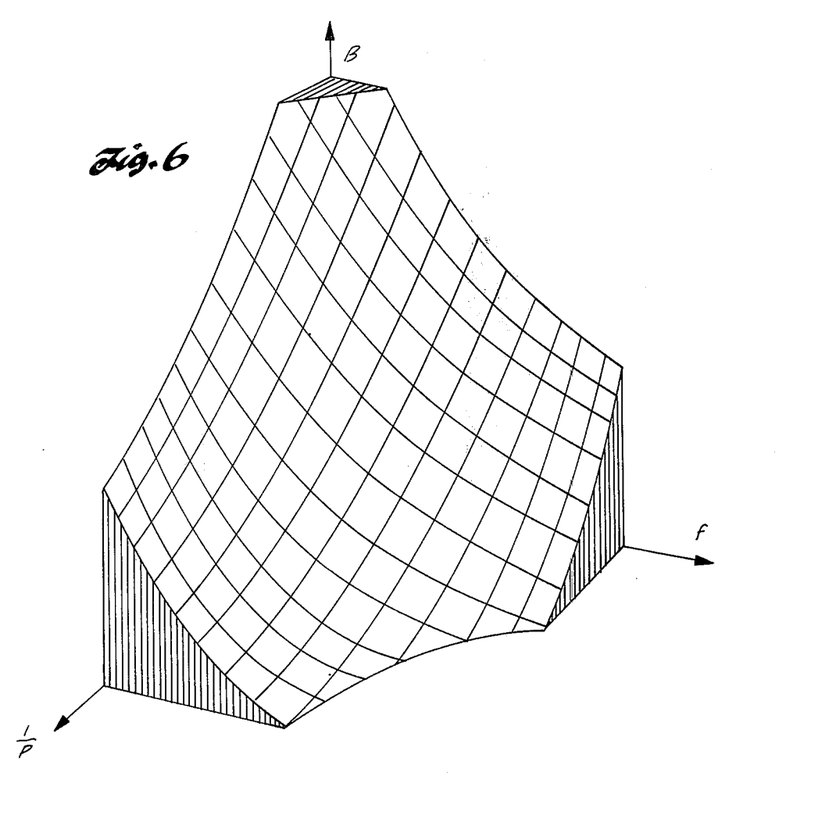
FIG. 6 is a symbolic map of the discharge parameters pressure, induction field frequency and induction field magnitude for a fixed discharge forming gas.

FIG. 6 represents the magnitude, $B$, of the magnetic induction field as a function of frequency, $f$, of the field, and the reciprocal of a gas pressure, $P$, for a particular gas.

The current state of the art of electronic components places a limitation on the frequency of radio frequency power that can be generated without appreciable loss in conversion efficiency from direct current power at a cost that permits the resulting lamp to be competitive with incandescent lamps. Reference is made to FIG. 3 for a description of an embodiment of the radio frequency oscillator housed in base 19 that provides a low megahertz frequency with moderately priced components. It is of particular significance that no ferrite core is required to produce an efficient conversion of electrical energy to light. The 120 volt-60 cycle alternating current energy applied to contacts 21 and 22 is converted to direct current at approximately 170 volts by rectifier 26. A smoothing capacitor 27 connected across the output of rectifier 26 filters the direct current. One terminal of rectifier 26 is grounded. The other terminal of rectifier 26 is connected by a bias resistor 28 to the base of a transistor 29 and by a radio frequency choke coil 30 to the collector of transistor 29. A capacitor 31 and induction coil 20 are connected in series between the collector and the base of transistor 29. A capacitor 32 is connected between the collector of transistor 29 and ground and a capacitor 33 is connected between the emitter and the base of transistor 29. The emitter of transistor 29 is connected to ground through a bias resistor 34 and capacitor 35. The circuit operates as a Colpitts oscillator modified by capacitor 31 in series with coil 20, i.e., a Clapp oscillator. The frequency of the oscillator is determined by the parallel resonant circuit comprising coil 20 and the effective capacitance of capacitors 31, 32, and 33 in series and the interelectrode capacitance of transistor 29. (After breakdown of the discharge, its reactance 36 represented by phantom lines affects the oscillator frequency slightly.) Coil 30 serves to block transmission of radio frequency currents from the tuned circuit to resistor 28, and any such currents are shorted to ground by capacitor 27. Capacitor 31 is small compared to capacitors 32 and 33; thus, the series resonant circuit comprising capacitor 31 and coil 20 is near resonance at the oscillator frequency. Before breakdown, there is little loss, i.e., power dissipation or effective resistance, in the series resonant circuit comprising capacitor 31 and coil 20; thus its Q is high. As a result, the series connection of capacitor 31 and coil 20 serves to multiply severalfold the available voltage applied across coil 20 before breakdown. The resulting large longitudinal electric field produced by coil 20 is sufficient, with the aid of the argon gas, to break down the mercury vapor to establish the induced discharge without an external starting circuit. The elimination of an external starting circuit results in substantial cost savings and design simplification. After the discharge is established, the power dissipation increases and the tuned circuit's Q diminishes; consequently, the multiplication of the available voltage applied across coil 20 is reduced substantially.

Figure 3:
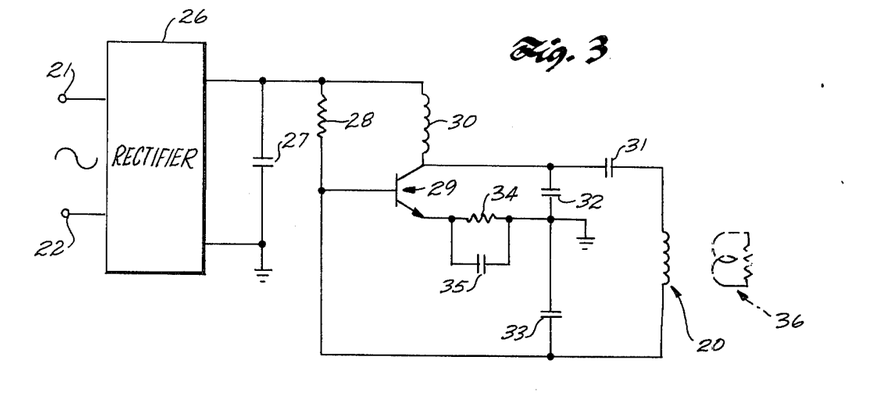
FIG. 3 is a schematic circuit diagram of a radio frequency oscillator housed within the base of the lamp shown in FIGS. 1 and 2.

The circuit of FIG. 3 has the following component values and types: transistor 29 — Motorola type 2N6498; collector to emitter capacitance of transistor 29 — approximately 100 picofarads; base to emitter capacitance of transistor 29 — approximately 400 picofarads; capacitor 31 — 200 picofarads; capacitor 32 — 360 picofarads; capacitor 33 — 3900 picofarads; capacitor 35 — 2000 picofarads; capacitor 27 — 150 microfarads; resistor 28 — 39,000 ohms; resistor 34 — 20 ohms; coil 30 — 40 microhenrys; induction coil 20 — 13.7 microhenrys.

The oscillator resonates at 3.6 megahertz in its unloaded condition, i.e., prior to breakdown of the mercury vapor. After breakdown, the inductance reflected by the discharge into the tuned circuit reduces the total effective inductance of the tuned circuit. Similarly, the proximity of the discharge increases the effective capacitance of the induction coil slightly, and the power absorbed by the discharge significantly increases the effective series resistance of the tuned circuit. The result is an increase of the frequency of the oscillator in its loaded condition to about 4 megahertz. With a 60 cycle input voltage of 120 volts RMS, the circuit dissipates 25 watts, as measured with an AC wattmeter "at the wall." The corresponding DC input power to the oscillator is 23.8 watts, producing a total white light output of 840 lumens. The 2N6498 transistor employed has a cut-off frequency of 5 Mhz and a storage time of 1.4 microseconds and operates in the described circuit under class A conditions at a measured collector efficiency of 44%. Thus, the overall luminous efficiency of the above device is 840 lumens/25 watt, or 33.6 lumens per watt; the DC luminous efficiency is 840/23.8 or 35.3 lumens per watt; the RF luminous efficiency is 840/.44 × 23.8, or 80.2 lumens per watt. An obvious improvement would be the substitution of a higher frequency transistor to enable class C operation where 70% collector efficiency is common to produce an overall system luminous efficiency of 53.5 lumens per watt of AC input power.

Figure 4:
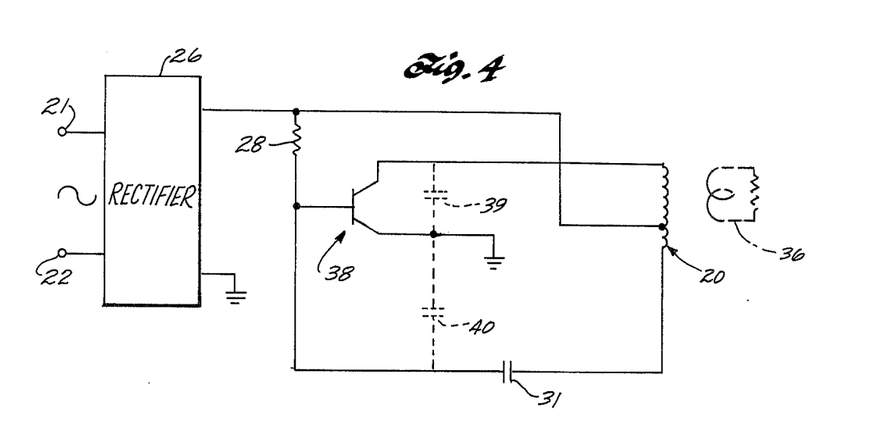
FIG. 4 is a schematic circuit diagram of a modification of the radio frequency oscillator in FIG. 3.

Reference is made to FIG. 4 for a modified oscillator employing fewer components than the oscillator of FIG. 3. Like components bear the same reference numerals in FIGS. 3 and 4. FIG. 4 employes a transistor 38 that is fabricated to have interrelectrode capacitance that, without external capacitors, provides the capacitance specified for the tuned circuit. Thus, the collector to emitter capacitance 39 of transistor 38 is equal to the capacitance of capacitor 32 and the collector to base capacitance of transistor 29 in FIG. 3, and the emitter to base capacitance 40 of transistor 38 is equal to the capacitance of capacitor 33 and the emitter to base capacitance of transistor 29 in FIG. 3. Further, component reduction is achieved by connecting the underground output of rectifier 26 to an intermediate point on induction coil 20 at which the radio frequency potential is zero. As a result, coil 30 and capacitor 27 are not needed to prevent passage of the radio frequency current through resistor 28.

Although the instrumentality for generating the magnetic field coupled to the ionizable medium is disclosed as an induction coil having a number of windings supported on a mandrel, other configurations for producing a magnetic induction field may be employed. This fact has an important practical application in operating existing commercially available tubular fluorescent lamps after their filaments or electrodes have worn out. In such case, a coil of wire may be extended around the entire envelope of the worn out fluorescent lamp and energized by a radio frequency oscillator in the manner described above. Such operation can prolong the useful life of the fluorescent lamp several fold.

The described embodiment of the invention is only considered to be preferred and illustrative of the inventive concept; the scope of the invention is not to be restricted to such embodiment. Various and numerous other arrangements may be devised by one skilled in the art without departing from the spirit and scope of this invention. For example, a radio frequency higher than 4 megahertz would provide higher efficiency, hence would be desirable if electronic circuit components that could generate such higher radio frequencies efficiently at a reasonable price were currently available.

What is claimed is:

1. A method for producing light from an electrodeless discharge established in an ionizable medium within a sealed envelope including at least one particular ionizable gas at a given pressure capable of emitting radiant energy when subjected to a radio frequency field, the method comprising the steps of:
    coupling to the medium an electric field having a magnitude sufficient to initiate ionization of the medium to form a radiation emitting discharge; and
    simultaneously coupling to the medium a radio frequency magnetic induction field for maintaining said ionization, said field having a frequency and peak magnitude such that on the average, the free electrons in the medium are accelerated to ionizing velocity in a distance equal to their mean free path in a time approximately equal to one-quarter of the period of said magnetic field, wherein both of said steps of coupling to the medium an electric field and coupling to the medium a radio frequency magnetic induction field comprise the steps of:
    positioning an induction coil wrapped around a nonmagnetic core in close physical proximity to said medium in said envelope; and
    connecting to said induction coil a radio frequency signal.

2. The method of claim 1, in which the frequency of said induction field is between 3 megahertz and 300 megahertz.

3. The method of claim 1, in which the frequency of said induction field is approximately 4 megahertz.

4. The method of claim 1, in which the ionizable medium comprises a mixture of mercury vapor and an inert starting gas having a pressure of one to several torr.

5. The method of claim 4, in which said starting gas is argon, helium or neon.

6. The method of claim 1, wherein said step of coupling to the medium an electric field further comprises the step of:
    positioning a capacitor in series with said induction coil.

7. An electrodeless discharge lamp comprising:
    a sealed envelope;

an ionizable medium within said envelope including at least one particular ionizable gas at a given pressure capable emitting radiant energy when subjected to a radio frequency field; and means including an induction coil wrapped around a nonmagnetic core positioned in close physical proximity to said medium in said envelope for coupling to said medium an electric field having a magnitude sufficient to initiate ionization of said medium and for simultaneously coupling to said medium in said envelope a radio frequency magnetic induction field for maintaining said ionization, the peak magnitude and frequency of said magnetic induction field being selected to optimize the efficiency of conversion of radio frequency energy coupled to said medium to emitted radiant energy.

8. A lamp according to claim 7 wherein said peak magnitude and frequency of said radio frequency magnetic induction field are selected such that on the average, the free electrons in said medium are accelerated to ionizing velocity in a distance equal to their mean free path in a time approximately equal to one-quarter of the period of said magnetic field.

9. A lamp according to claim 7 wherein said radio frequency magnetic induction field has a particular peak magnitude, and said frequency thereof is selected to optimize the efficiency of conversion of radio frequency energy coupled to said medium to emitted radiant energy.

10. A lamp according to claim 7 wherein said radio frequency magnetic induction field has a particular frequency, and said peak magnitude thereof is selected to optimize the efficiency of conversion of radio frequency energy coupled to said medium to emitted radiant energy.

11. A lamp according to claim 7 in which said coupling means comprises:

a radio frequency oscillator having a frequency determining resonant circuit including said induction coil and a capacitor in series with said induction coil, said capacitor and said induction coil cooperating with said radio frequency oscillator to produce across said induction coil said electric field having a magnitude sufficient to initiate ionization of said medium within said envelope to form a radiation emitting discharge.

12. A lamp according to claim 11 wherein the Q of said resonant circuit is sufficiently large that the electric field across said induction coil causes initial ionization of said medium in said envelope and wherein the induction field of said induction coil is sufficiently large to maintain radiation emitting ionization of said medium.

13. A lamp according to claim 12 wherein ionization of said medium decreases said Q of said resonant circuit to a value sufficient to optimize the efficiency of conversion of radio frequency energy coupled to said medium to emitted radiant energy.

14. A lamp according to claim 11 in which said radio frequency oscillator has a frequency between 3 megahertz and 300 megahertz.

15. A lamp according to claim 11 in which said radio frequency oscillator has a frequency of approximately 4 megahertz.

16. A high frequency electrodeless fluorescent lamp comprising:

a sealed envelope;

a charge in said envelope comprising an inert starting gas and mercury vapor;

a layer of fluorescent light emitting phosphor disposed on the inner surface of said envelope, said phosphor being capable of emitting white light within the visible spectrum upon absorption of ultraviolet radiation from said mercury vapor when ionized;

an induction coil wrapped around a nonmagnetic core positioned so a substantial portion of its magnetic induction field passes through said charge in said envelope;

means for generating electrical energy at a radio frequency above three megahertz; and means for coupling said electrical energy to said induction coil to produce thereacross an electric field that initiates ionization of said charge in said envelope to emit ultraviolet radiation and simultaneously produces a magnetic induction field for maintaining said ionization.

17. The lamp of claim 16, in which said generating means comprises an oscillator having a resonant circuit that includes said induction coil.

18. The lamp of claim 17, in which said oscillator is a Clapp oscillator.

19. The lamp of claim 18, in which said resonant circuit resonates at about four megahertz.

20. The lamp of claim 18, in which said induction coil has a radio frequency null point, the lamp additionally comprising a rectifier having an output terminal connected to said null point to provide supply voltage to said oscillator.

21. The lamp of claim 20, in which said resonant circuit additionally comprises a capacitor in series with said induction coil, said capacitor and said induction coil having a resonant frequency sufficiently near to the resonant frequency of the resonant circuit to generate across said induction coil sufficient voltage to initiate break down of said charge in said envelope.

22. The lamp of claim 16, in which said induction coil is wrapped around a nonconductive core.

23. A high frequency electrodeless fluorescent lamp comprising:

a sealed envelope;

an ionizable medium within said envelope;

an oscillator for generating high frequency electrical energy, said oscillator having a resonant circuit including a capacitor and an induction coil connected in series; and means for positioning said induction coil in close proximity to said medium in said envelope so a substantial portion of its magnetic induction field and electric field passes through said medium;

the Q of said capacitor and induction coil being sufficiently large that the electric field across said induction coil initiates break down of said ionizable medium to form radiation emitting ionization and said magnetic induction field being sufficiently large to maintain the radiation emitting ionization of said medium.

24. The lamp of claim 23, in which said ionizable medium comprises an inert starting gas and mercury vapor having a pressure of one to five torr.

25. The lamp of claim 24, in which said starting gas is argon, helium or neon.

26. The lamp of claim 25, in which said resonant circuit additionally comprises capacitance means connected in parallel with said capacitor and induction coil in series.

27. The lamp of claim 26, in which said oscillator comprises a Clapp oscillator and said capacitance means comprises first and second voltage dividing capacitors connected in series with each other.

28. The lamp of claim 27, in which the frequency of said electrical energy is between 3 megahertz and 300 megahertz.

* * * * *

UNITED STATES PATENT OFFICE
CERTIFICATE OF CORRECTION

Patent No. 4,010,400            Dated March 1, 1977

Inventor(s) Donald D. Hollister

It is certified that error appears in the above-identified patent and that said Letters Patent are hereby corrected as shown below:

In column 14, line 6, insert the following Claim:

29. A method for producing light from an electrodeless discharge established in an ionizable medium within a sealed envelope including at least one particular ionizable gas at a given pressure capable of emitting radiant energy when subjected to a radio frequency field, the method comprising the steps of:

coupling to the medium an electric field having a magnitude sufficient to initiate ionization of the medium to form a radiation emitting discharge; and simultaneously coupling to the medium, with an induction coil wrapped around a non-magnetic core, a radio frequency magnetic induction field for maintaining said ionization, said induction field having a frequency of between 3 megahertz and 300 megahertz and having a frequency and peak magnitude such that on the average, the free electrons in the medium are accelerated to ionizing velocity in a distance equal to their mean free path in a time approximately equal to one-quarter of the period of said magnetic field.

On the cover sheet, "28 Claims" should read -- 29 Claims --.

Signed and Sealed this

Twenty-second Day of November 1977

[SEAL]

Attest:

RUTH C. MASON          LUTRELLE F. PARKER
*Attesting Officer*      *Acting Commissioner of Patents and Trademarks*